United States Patent
Waechter-Stehle et al.

(10) Patent No.: US 10,319,090 B2
(45) Date of Patent: Jun. 11, 2019

(54) ACQUISITION-ORIENTATION-DEPENDENT FEATURES FOR MODEL-BASED SEGMENTATION OF ULTRASOUND IMAGES

(71) Applicant: KONINKLIJKE PHILIPS N.V., Eindhoven (NL)

(72) Inventors: Irina Waechter-Stehle, Hamburg (DE); Tobias Klinder, Uelzen (DE); Cristian Lorenz, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 164 days.

(21) Appl. No.: 15/310,844

(22) PCT Filed: May 5, 2015

(86) PCT No.: PCT/EP2015/059770
§ 371 (c)(1),
(2) Date: Nov. 14, 2016

(87) PCT Pub. No.: WO2015/173056
PCT Pub. Date: Nov. 19, 2015

(65) Prior Publication Data
US 2017/0091934 A1    Mar. 30, 2017

(30) Foreign Application Priority Data
May 14, 2014  (EP) .................................. 14168298

(51) Int. Cl.
*G06T 7/00*    (2017.01)
*G06T 7/11*    (2017.01)
(Continued)

(52) U.S. Cl.
CPC ............. *G06T 7/0012* (2013.01); *G06T 7/11* (2017.01); *G06T 7/149* (2017.01); *G06T 7/174* (2017.01);
(Continued)

(58) Field of Classification Search
CPC ....... G06T 7/0012; G06T 7/0081; G06T 7/11; G06T 7/149; G06T 7/174; G06T 2207/10132; G06T 2207/30044
See application file for complete search history.

(56) References Cited

U.S. PATENT DOCUMENTS 6,228,028 B1 * 5/2001 Klein .................... G01S 7/5205
600/437
6,402,693 B1 * 6/2002 Emery ..................... A61B 8/00
600/443
(Continued)

FOREIGN PATENT DOCUMENTS

WO    2014147542 A1    9/2014

OTHER PUBLICATIONS

Sung, et al., "Pose-Robust Facial Expression Recognition Using View-Based 2D+3D AAM", IEEE Transactions on Systems, Man and Cybernetics, vol. 38, No. 4, Jul. 1, 2008, pp. 852-866.
(Continued)

*Primary Examiner* — Mekonen T Bekele

(57) ABSTRACT

A model-based segmentation system includes a plurality of clusters (48), each cluster being formed to represent an orientation of a target to be segmented. One or more models (140) are associated with each cluster. The one or more models include an aspect associated with the orientation of the cluster, for example, the appearance of the target to be segmented. A comparison unit (124), configured in memory storage media, is configured to compare an ultra-sound image to the clusters to determine a closest matching ori-
(Continued)

entation and is configured to select the one or more models based upon the cluster with the closest matching orientation. A model adaptation module (126) is configured to adapt the one or more models to the ultrasound image.

20 Claims, 6 Drawing Sheets

(51) Int. Cl.
G06T 7/149 (2017.01)
G06T 7/174 (2017.01)

(52) U.S. Cl.
CPC .............. *G06T 2207/10132* (2013.01); *G06T 2207/30044* (2013.01)

(56) References Cited

U.S. PATENT DOCUMENTS

| | | | |
|---|---|---|---|
| 6,443,896 B1 | 9/2002 | Detmer | |
| 6,530,885 B1 | 3/2003 | Entrekin et al. | |
| 9,380,995 B2* | 7/2016 | Lee | A61B 5/1075 |
| 2007/0078343 A1* | 4/2007 | Kawashima | A61B 8/12 600/443 |
| 2008/0269604 A1* | 10/2008 | Boctor | A61B 8/00 600/437 |
| 2008/0306384 A1* | 12/2008 | Boctor | A61B 8/08 600/443 |
| 2010/0022883 A1* | 1/2010 | Satoh | A61B 8/14 600/447 |
| 2011/0224546 A1* | 9/2011 | Lee | A61B 8/0866 600/443 |
| 2012/0101383 A1* | 4/2012 | Hyun | A61B 5/1072 600/443 |
| 2013/0329061 A1* | 12/2013 | Jeung | G06F 17/30265 348/207.1 |
| 2014/0004488 A1* | 1/2014 | Tepper | G09B 23/286 434/219 |
| 2015/0057544 A1* | 2/2015 | Takagi | A61B 8/463 600/441 |
| 2015/0094585 A1* | 4/2015 | Ter-Ovanesyan | A61B 8/468 600/443 |
| 2017/0164931 A1* | 6/2017 | Ng | A61B 8/0841 |
| 2017/0169609 A1* | 6/2017 | Somphone | G06T 7/0012 |
| 2017/0209715 A1* | 7/2017 | Ruebel | A61N 5/1039 |
| 2017/0316588 A1* | 11/2017 | Homann | G06T 11/008 |
| 2017/0333002 A1* | 11/2017 | Ohishi | A61B 8/4263 |
| 2017/0367677 A1* | 12/2017 | Hsu | A61B 8/0825 |
| 2018/0113577 A1* | 4/2018 | Burns | G06F 3/04817 |
| 2018/0158201 A1* | 6/2018 | Thompson | G06T 7/344 |

OTHER PUBLICATIONS

Cootes, et al., "View-Based Active Appearance Models", Automatic Face and Gesture Recognition, 2000, Fourth IEEE International Conference on Grenoble, France, Mar. 28-30, 2000, Los Alamitos, CA, pp. 227-232.

Hesse, "Multi-View Facial Expression Classification", Diploma Thesis, Mar. 30, 2011.

Fua, et al., "Stable Real-Time 3D Tracking Using Online and Offline Information", IEEE Transactions on Pattern Analysis and Machine Intelligence, IEEE Computer Society, vol. 26, No. 10, Oct. 1, 2004, pp. 1385-1391.

Peters, et al., "Optimizing boundary detection via Simulated Search with applications to multi-modal heart segmentation", Medical Image Analysis 14 (2010), pp. 70-84 (Abstract).

Ecabert, et al., "Automatic Model-Based Segmentation of the Heart in CT images", IEEE Transactions on Medical Imaging, vol. 27(9), 2008, pp. 1189-1201 (Abstract).

* cited by examiner

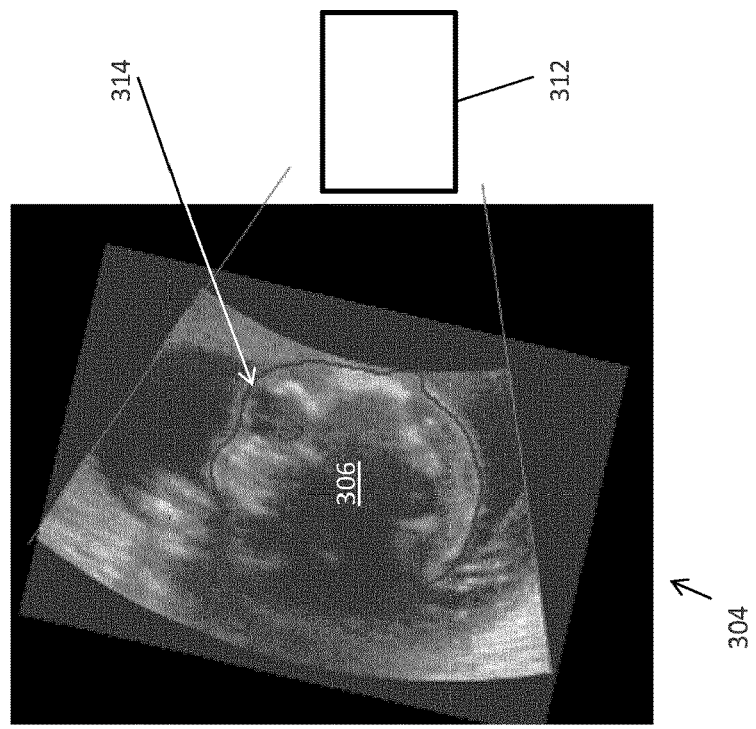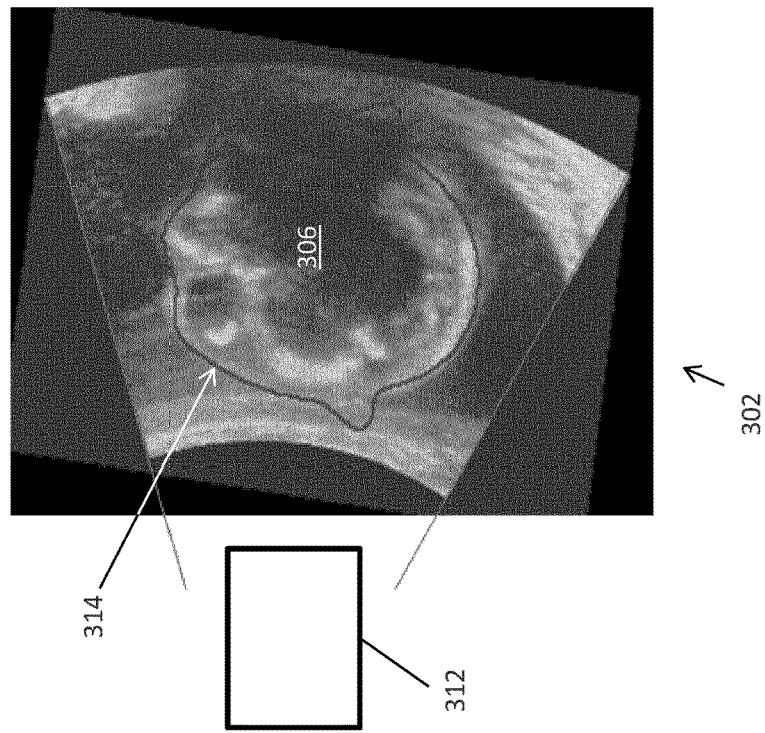
FIG. 3

ACQUISITION-ORIENTATION-DEPENDENT FEATURES FOR MODEL-BASED SEGMENTATION OF ULTRASOUND IMAGES

This application is the U.S. National Phase application under 35 U.S.C. § 371 of International Application No. PCT/EP2015/059770, filed on May 5, 2015, which claims the benefit of European Application Ser. No. 14168298.9, filed May 14, 2014. These applications are hereby incorporated by reference herein.

BACKGROUND

In model-based segmentation for computed tomography (CT) images, it is assumed that an organ to be segmented generally has the same image appearance. For each triangle of a surface model, a boundary detection feature that describes the local image appearance is learned. For ultrasound images, image appearance changes when the relative position or orientation of the object to the probe changes. For some applications, it is possible to define the orientation in an acquisition protocol (for example, in Transthoracic Echocardiograms (TTE)) but for other protocols, it is not possible to define the orientation. This is particularly relevant for fetal ultrasound images. As the fetus is moving freely in the uterus, it is impossible to impose that the image be acquired from a fixed orientation with respect to the fetus. Performing adaptation with an incorrect set of features can cause inaccuracies in the segmentation.

SUMMARY

This disclosure relates to medical systems and more particularly to an ultrasonic imaging system configured to select segmentation models according to the orientation of an object for segmentation.

In accordance with the present principles, a model-based segmentation system includes a plurality of clusters, each cluster being formed to represent an orientation of a target to be segmented. One or more models are associated with each cluster, the one or more models including at least one aspect associated with the orientation of the cluster. A comparison unit is configured in memory storage media, is configured to compare an ultrasound image to the clusters to determine a closest matching orientation and is configured to select the one or more models based upon the cluster with the closest matching orientation. A model adaptation module is configured to adapt the one or more models to the ultrasound image.

Another model-based segmentation system includes a plurality of clusters of ultrasound images formed to represent orientations of an in utero fetus to be digitally segmented. One or more models are associated with each cluster, the one or more models including at least one aspect associated with the orientation of the cluster, the at least one aspect including an appearance model of the fetus. A comparison unit is configured in memory storage media, is configured to compare an ultrasound image of the fetus to the clusters to determine a closest matching orientation and is configured to select the one or more models based upon the cluster with the closest matching orientation. A model adaptation module is configured to adapt the one or more models to the ultrasound image.

A method for model-based image segmentation includes determining an orientation of an ultrasonic probe relative to a target to be segmented; associating one or more models with image-trained clusters, the one or more models including at least one aspect associated with the orientation of the cluster; comparing an ultrasound image to the image-trained clusters to determine a closest matching orientation; and selecting the one or more models based upon the image-trained cluster with the closest matching orientation for model adaptation to the ultrasound image.

In certain aspects, the present invention further includes a system for model-based image segmentation, which can include instructions thereon, which when executed, cause the system to receive input data defining an orientation of an ultrasonic probe relative to a target to be segmented, associate one or more models with image-trained clusters, the one or more models including at least one aspect associated with the orientation of the cluster, compare an ultrasound image to the image-trained clusters to determine a closest matching orientation, select (512) the one or more models based upon the image-trained cluster with the closest matching orientation for model adaptation to the ultrasound image, and identify the orientation of the target to be segmented in relation to the ultrasound probe. The ultrasound image can include an anatomical feature of a fetus that is displayed in different orientations depending on the orientation of the ultrasonic probe relative to the target.

These and other objects, features and advantages of the present disclosure will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein:

FIG. 3 is a diagram showing ultrasonic images of an in utero fetus and showing relative orientations of an imaging probe to the fetus in accordance with the present principles;

DETAILED DESCRIPTION OF EMBODIMENTS

Figure 1:
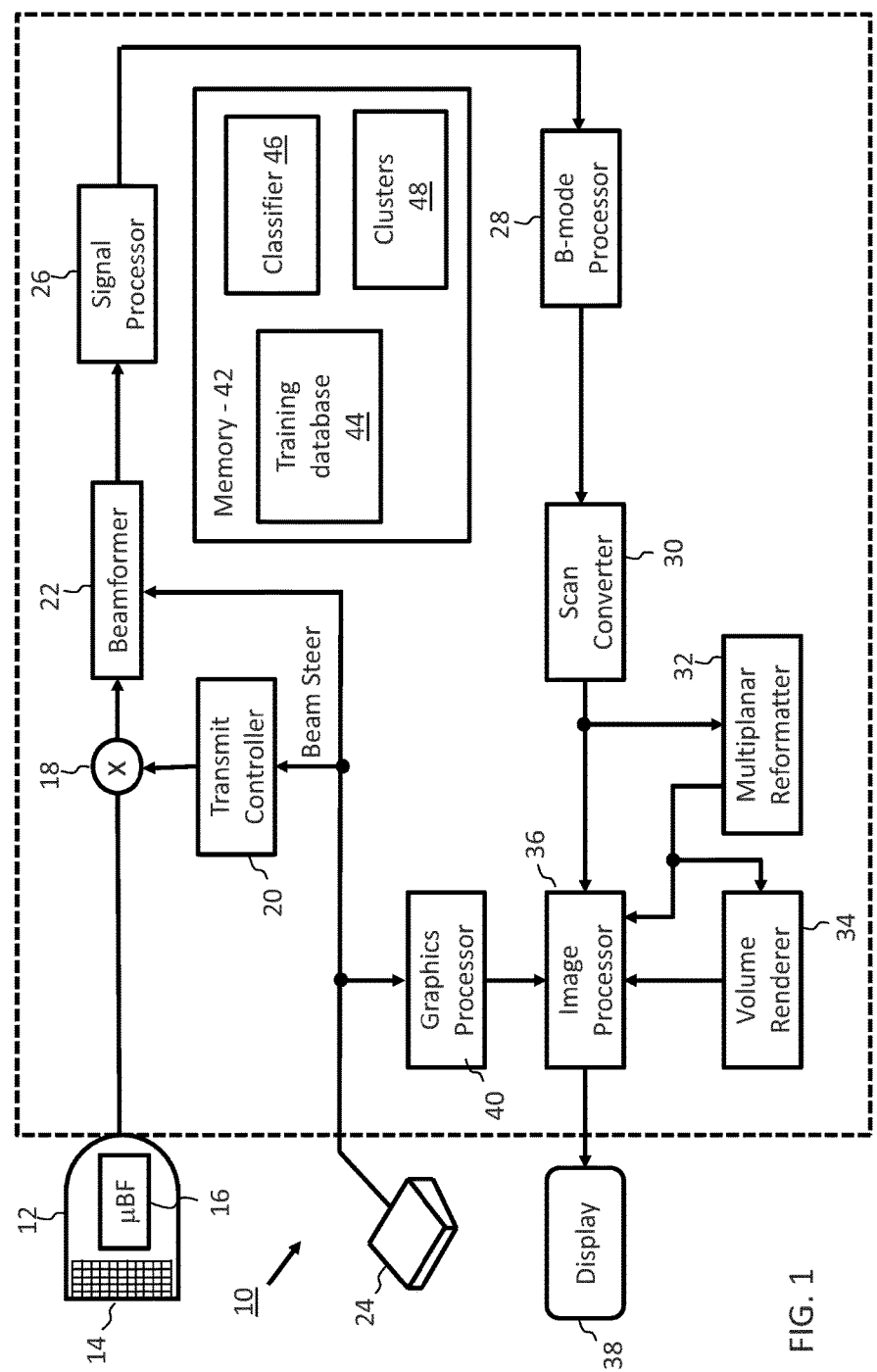
FIG. 1 is a block/flow diagram showing an ultrasonic imaging system configured for training image clusters in accordance with the present principles.

In accordance with the present principles, model-based segmentation is performed using more accurate model selection to perform adaptation of the model or models. In ultrasound imaging, an imaging probe gathers imaging data, which may appear differently, based upon the orientation of the probe, that is, image appearance changes when the relative position or orientation of an imaged object changes relative to the probe. In one embodiment, fetal ultrasound images are collected. As the fetus is moving freely in the uterus, it is extremely difficult to define the image that should be acquired from a fixed orientation with respect to the fetus. For example, a user may not be able to easily identify whether they are imaging the left side or the right side of a fetus's head. In accordance with the present principles, anatomical features are chosen according to an orientation of the fetus with respect to the probe. For example, the right ear can be chosen to assist with identifying how the probe is oriented with respect to the fetus. In a training phase of a model of the present invention, images of different orientations are clustered into different clusters of images and, for each cluster, features are trained which account for different orientations of the fetus relative to the imaging probe. In a segmentation phase of a model of the present invention, the closest orientation cluster of images associated with a particular orientation is determined and employed to select, in real-time, which segmentation model should be employed that best matches the position of the fetus in the image. A model-based segmentation can be performed on the fetus or other target to adapt the model or models to the image and analyze the image(s) in accordance with the model or models. By selecting an appropriate model, in real-time, segmentation accuracy is improved and image-processing time is reduced.

It should be understood that the present invention will be described in terms of medical systems; however, the teachings of the present invention are much broader and are applicable to any system that employs directional imaging. In some embodiments, the present principles are employed in tracking or analyzing complex biological or mechanical systems. In particular, the present principles are applicable to internal tracking procedures of biological systems in all areas of the body such as the lungs, gastro-intestinal tract, uterus, a heart, an in utero fetus, excretory organs, blood vessels, etc. The elements depicted in the FIGS. may be implemented in various combinations of hardware and software and provide functions which may be combined in a single element or multiple elements.

The functions of the various elements shown in the FIGS. can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), non-volatile storage, etc.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams and the like represent various processes, which may be substantially represented in computer readable storage media and so executed by a computer or processor, whether or not such computer or processor is explicitly shown.

Furthermore, embodiments of the present invention can take the form of a computer program product accessible from a computer-usable or computer-readable storage medium providing program code for use by or in connection with a computer or any instruction execution system. For the purposes of this description, a computer-usable or computer readable storage medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk—read/write (CD-R/W), Blu-Ray™ and DVD.

Referring now to the drawings in which like numerals represent the same or similar elements and initially to FIG. 1, an ultrasound imaging system 10 constructed in accordance with the principles of the present invention is shown in block diagram form. In the ultrasonic diagnostic imaging system of FIG. 1, an ultrasound probe 12 includes a transducer array 14 for transmitting ultrasonic waves and receiving echo information. A variety of transducer arrays are well known in the art, e.g., linear arrays, convex arrays or phased arrays. The transducer array 14, for example, can include a two dimensional array (as shown) of transducer elements capable of scanning in both elevation and azimuth dimensions for 2D and/or 3D imaging. The transducer array 14 is coupled to a microbeamformer 16 in the probe 12, which controls transmission and reception of signals by the transducer elements in the array. In this example, the microbeamformer 16 is coupled by the probe cable to a transmit/receive (T/R) switch 18, which switches between transmission and reception and protects a main beamformer 22 from high energy transmit signals. In some embodiments, the T/R switch 18 and other elements in the system can be included in the transducer probe rather than in a separate ultrasound system base. The transmission of ultrasonic beams from the transducer array 14 under control of the microbeamformer 16 is directed by a transmit controller 20 coupled to the T/R switch 18 and the beamformer 22, which receives input from the user's operation of a user interface or control panel 24. One of the functions controlled by the transmit controller 20 is the direction in which beams are steered. Beams may be steered straight ahead from (orthogonal to) the transducer array, or at different angles for a wider field of view. The partially beamformed signals produced by the microbeamformer 16 are coupled to the main beamformer 22 where partially beamformed signals from individual patches of transducer elements are combined into a fully beamformed signal.

The beamformed signals are coupled to a signal processor 26. The signal processor 26 can process the received echo signals in various ways, such as bandpass filtering, decimation, I and Q component separation, and harmonic signal separation. The signal processor 26 may also perform additional signal enhancement such as speckle reduction, signal compounding, and noise elimination. The processed signals are coupled to a B mode processor 28, which can employ amplitude detection for the imaging of structures in the body. The signals produced by the B mode processor 28 are coupled to a scan converter 30 and a multiplanar reformatter 32. The scan converter 30 arranges the echo signals in the spatial relationship from which they were received in a desired image format. For instance, the scan converter 30 may arrange the echo signal into a two dimensional (2D) sector-shaped format, or a pyramidal three dimensional (3D) image. A multiplanar reformatter 32 can convert echoes, which are received from points in a common plane in a volumetric region of the body into an ultrasonic image of that plane, as described in U.S. Pat. No. 6,443,896 (Detmer), which is incorporated by reference herein in its entirety. A volume renderer 34 converts the echo signals of a 3D data set into a projected 3D image as viewed from a given reference point, e.g., as described in U.S. Pat. No. 6,530,885 (Entrekin et al.), which is incorporated by reference herein in its entirety. The 2D or 3D images are coupled from the scan converter 30, multiplanar reformatter 32, and volume renderer 34 to an image processor 36 for further enhancement, buffering and temporary storage for display on an image display 38. The graphics processor 36 can generate graphic overlays for display with the ultrasound images. These graphic overlays can contain, e.g., standard identifying information such as patient name, date and time of the image, imaging parameters, and the like. For these purposes, a graphics processor 40 receives input from the user interface 24, such as a typed patient name. The user interface can also be coupled to the multiplanar reformatter 32 for selection and control of a display of multiple multiplanar reformatted (MPR) images. In certain embodiments, the display can be configured to show an indicator to a user so as to show the user how the probe is oriented with respect to a target being imaged, e.g., to show a probe in relation to right ear of a fetus instead of the left ear. Identification of the orientation can be performed using the methods described herein and the display can then, from that information, display the indicator for user interpretation. The indicator can be implemented in software through receiving input data that identifies where an ultrasound probe is positioned in relation to a target being imaged (e.g., a fetus). The indicator can include, e.g., arrows, text identifying an orientation, and/or an image of a digital representation of a probe in space relative to a target.

A memory unit or system 42 may include non-transitory storage media for storing data or outputs for one or more of the processors 26, 28, 36, 40 or any other component(s) of the imaging system 10. In one particularly useful embodiment, the system 10 may be employed as a training system as well as an imaging system. In such a case, the memory 42 may include a training database 44 configured to store training data for determining a position of a target during image processing. Training data is clustered by a classifier 46 to form clusters related to possible positions of a target. In one particular useful embodiment, the classifier 46 forms clusters 48 based upon a position of a fetus, e.g., one cluster may be based upon a plurality of images including a nose perspective, one cluster may be based upon a plurality of images including a side perspective (right or left with one set being flipped to reduce the number of clusters), one cluster may be based upon a plurality of images including a back of a head perspective, etc. It should be noted that any number (greater or lesser) of clusters may be formed depending on the application at hand. The classifier 46 may be configured to apply weighting to features in the images to make scoring or matching the trained data to collected images easier and more accurate.

It should be understood that the training database 44 and the classifier 46 may be omitted from the system 10 if the system 10 is not configured for training The system 10 would include the clusters 48 derived from the training data collected by another system at another time. The memory 42 serves and may be coupled to one or more of the elements depicted in FIG. 1.

Figure 2:
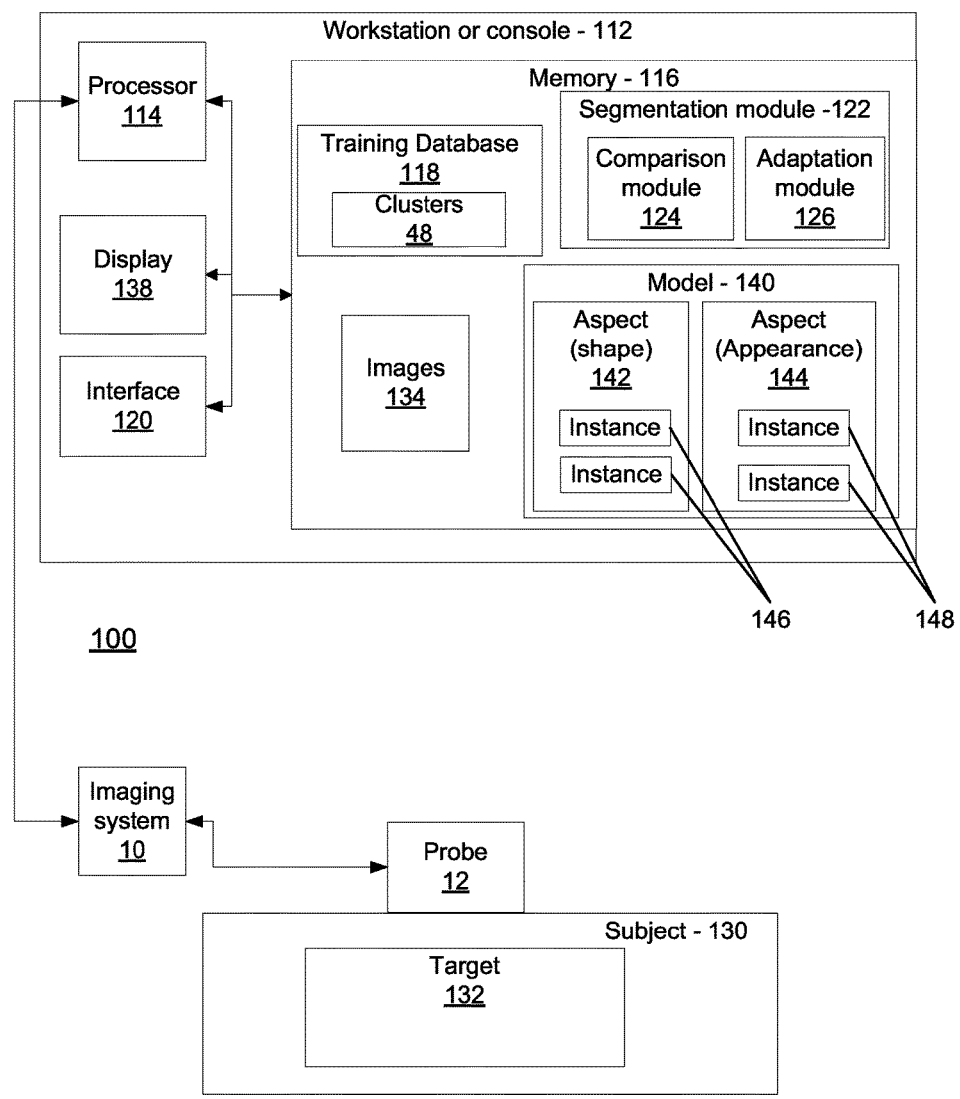
FIG. 2 is a block/flow diagram showing a model-based segmentation system, which employs orientation models and an ultrasonic imaging system in accordance with illustrative embodiments of the present principles.

The training data of the ultrasound imaging system 10 is provided to a processing system or workstation 100 (FIG. 2). The workstation 100 may include the imaging system 10 therein or the imaging system 10 may be a separate unit. The ultrasound imaging system 10 may be employed in training of system models and for taking real-time images as will be described.

Referring to FIG. 2, the processing system 100 is illustratively shown in accordance with one embodiment. System 100 may include a workstation or console 112 from which a procedure is supervised and/or managed. Workstation 112 preferably includes one or more processors 114 and memory 116 for storing programs and applications. Memory 116 may store a training database 118 configured to store training data employed for building models.

For model-based segmentation, a model or models 140 may include a plurality of aspects. In one embodiment, the model includes at least two aspects, a shape model 142 and an appearance model 144. Both the shape model 142 and/or the appearance model may be trained in the training phase of the model to provide models having positions or orientations that correspond to the clusters 48. The shape model 142 describes the shape of the object or target that is to be segmented. The shape model 142 includes expected shapes and may include expected variations of the target. The shape model 142 may include a mesh of elements, and in one particular instance, a mesh of triangles. Other forms of shape models and/or mesh elements may also be employed. In the appearance model 144, an expected appearance is encoded. For each entity of the mesh (triangle), how the image looks in its respective region is learned. Appearance model 144 may include information about image/pixel intensities, gradients, textures, etc.

The model aspects (e.g., the shape model 142 and/or the appearance model 144) may each include a plurality of instances 146 and 148, respectively. The instances 146 provide a complete model corresponding to different positions of a target 132 (e.g., an in utero fetus). These instances 146 and 148 of the models are trained in accordance with the clustered positions provided in clusters 48.

During model-adaptation and segmentation, the ultrasonic imaging probe 12 is employed to collect images from a subject 130. In a particularly useful embodiment, the subject 130 includes a patient, and the target 132 includes a fetus. Since the fetus can move freely in the uterus, the position of the fetus needs to be determined to provide an accurate and efficient segmentation of the fetus. From initial images of the fetus (or other dynamic target), a position/orientation of the probe 12 relative to the fetus 132 can be determined. The position of the probe 12 can be determined based on metadata contained in a Digital Imaging and Communications in Medicine (DICOM) header (or other stored data), based on image processing methods, based on a visual evaluation of the probe 12 and/or the fetus 132 in the image, etc. The position of the probe 12 is employed to choose image features according to the orientation of the fetus with respect to the probe 12. Since the fetal appearance changes with probe orientation and the position of the fetus relative to the probe 12, the position of the fetus needs to be determined. This can be performed by image processing to compare the collected image features with features in the clusters 48. From the training phase, the fetal orientations are clustered and for each cluster, features are trained. A cluster with a highest similarity score based on searched features is selected as the orientation of the fetus in the given image. In some embodiments, the system can accept a user input from a user that may evaluate the position of the fetus and input a position/orientation for the image so as to provide additional suggestion of what orientation the probe may be in relation to the target being imaged The selected cluster has a model instance or instances (e.g., 146 and 148) associated therewith. This model instance is selected on-the-fly in real-time to ensure the proper orientation of the model with respect to the fetus. The selection of the model in real-time reduces computation time, operator intervention and improves accuracy of a subsequent segmentation process. The selected model can then be employed in a model-based segmentation where measurement and analysis of the target 132 (e.g., fetus) can be performed. In some embodiments, segmented images permit measurements such as fetal size, brain volume, etc.

Workstation 112 includes a display 138 for viewing internal images of a subject (patient) 130 or volume/target 132 and may include ultrasonic images 134 although other types of images may be employed. Display 138 may also permit a user to interact with the workstation 112 and its components and functions, or any other element within the system 100. This is further facilitated by an interface 120, which may include a keyboard, mouse, a joystick, a haptic device, or any other peripheral or control to permit feedback from and/or user interaction with the workstation 112.

The workstation 112 includes a segmentation module 122 that can segment images or portions of images to define volumes or planes in collected images. A same or different workstation 112 may be employed to interpret real-time or stored images of a target. For simplicity, workstation 112 may be configured for both training models and for image processing real-time or stored images. In accordance with the present principles, image processing may include identifying image features, associating these features with clusters to identify position/orientation, segmenting the image using cluster associated model selections, analyzing the image, etc.

The segmentation module 122 includes a comparison module or unit 124 and is configured to compare an ultrasound image (a collected image 134) to the clusters 48 to determine a closest matching orientation therebetween. In one embodiment, the ultrasound image can be compared to images in one or more clusters using one or more image comparison algorithms. Generally, any image comparison algorithm known in the art can be used, e.g., to take one image and compare pixels or other image information with other images to identify degrees of similarity of some or all of the image and/or images being compared. The comparison module 124 may employ image-processing techniques to compare images to clusters and derive a similarity score. The term similarity score is employed for simplicity. It should be understood that any relative scoring system may be employed including eliminating images based on image differences, etc. The best similarity score would be used to identify a selected cluster. The selected cluster will be employed to select one or more models having the closest matching orientation.

A model adaptation module or unit 126 is configured to adapt the one or more models to the ultrasound image. The adaptation (e.g., mesh generation) may be performed using known techniques to correlate models to the image.

Referring to FIG. 3, illustrative ultrasound images 302 and 304 show a position of a probe 312 relative to a fetus 314. In the training phase, images are clustered according to their orientation with respect to the probe. For example, a head 306 of a fetus is generally acquired from two different sides as illustratively depicted, either from the left or from the right. The pelvis and femurs are acquired from the front, from the left side or from the right side. For each orientation, a distinctive feature set is trained and clustered. Training may include gathering images having a same orientation and clustering the images to identify features that are typical for a fetus in that position. These clusters are employed to provide an automatic comparison against a real-time image to be segmented. The clusters identify typical features for a given orientation of the fetus. When the comparison is performed, the clusters are scored and the highest similarity score is selected as the orientation of the image.

The number of clusters may vary based upon the goals of a given application. For example, the number of clusters may be reduced to improve computation time, or increased to improve model fitting accuracy. Each cluster includes one or more models or aspects of models associated therewith.

Figure 4:
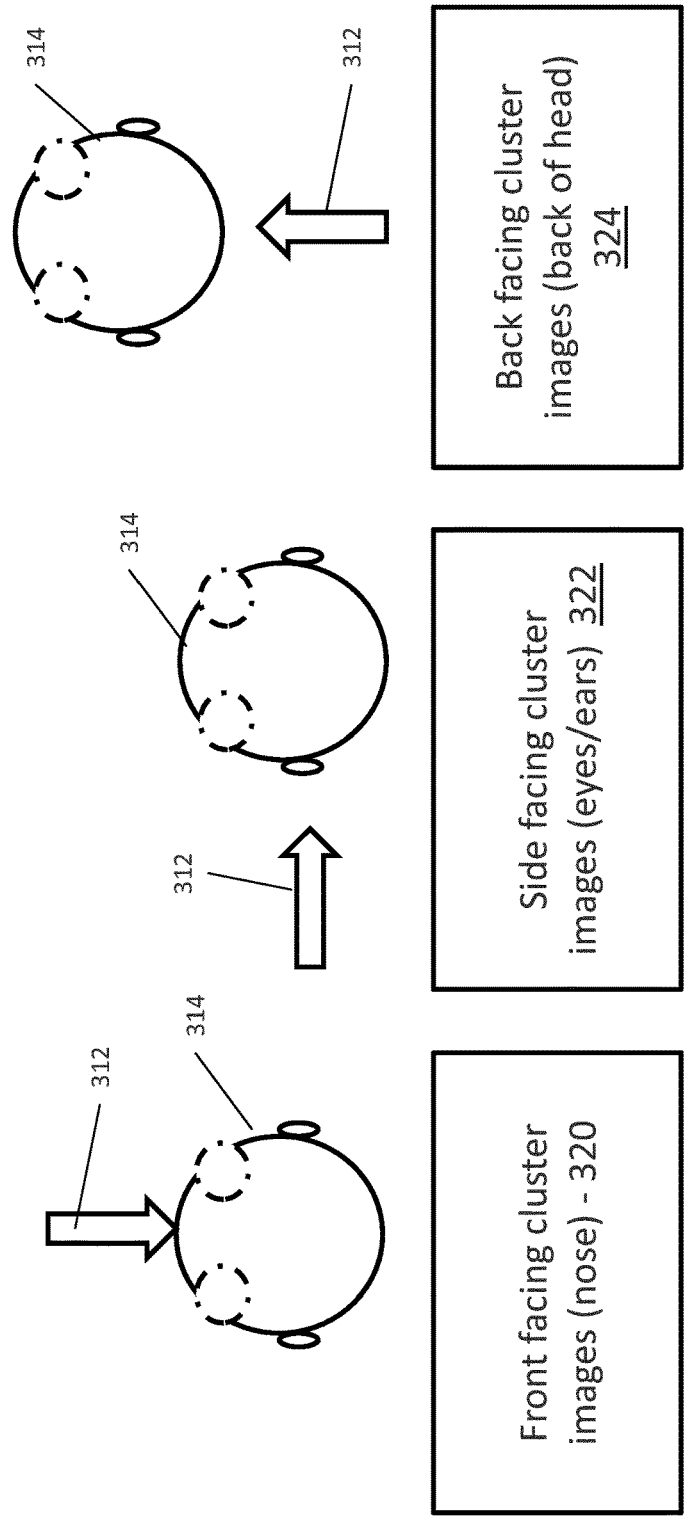
FIG. 4 is a diagram showing three illustrative ultrasonic image clusters for the in utero fetus in accordance with the present principles.

Referring to FIG. 4, an illustrative diagram shows three clusters associated with a fetus position relative to a probe 312. These clusters may include a first cluster 320 having a plurality of front facing images, a second cluster 322 having a plurality of side facing images (left and right sides may be clustered together by flipping images from one side to correspond to images of the other side) and/or a third cluster 324 having a plurality of back of the head images. A greater number (or lesser number) of clusters may also be employed. The clusters include information from a plurality of images in that particular orientation. For example, five or more images are clustered together in the training phase to create a record of features associated with that particular orientation.

Figure 5:
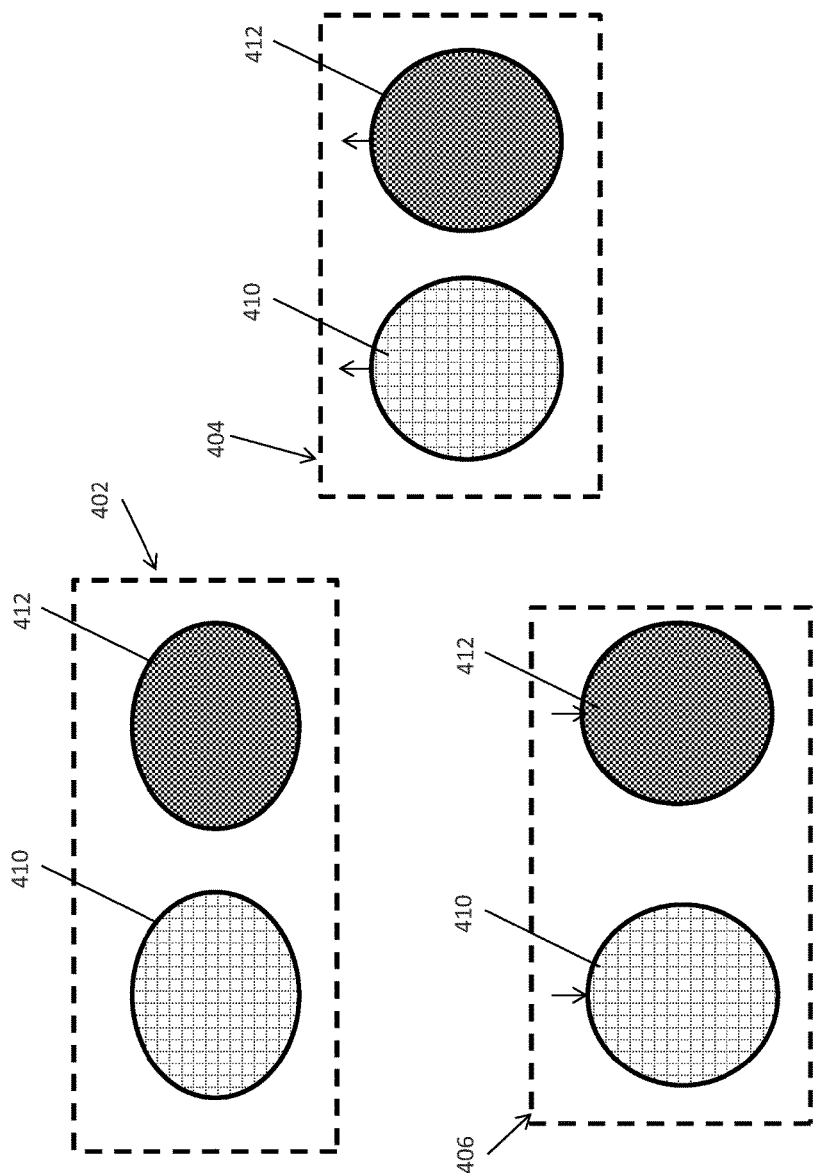
FIG. 5 is a diagram showing three illustrative models and their respective aspects (e.g., shape and appearance models) for an in utero fetus in accordance with the present principles.

Referring to FIG. 5, each cluster includes an associated model or aspects of models. The clusters are associated with models 402, 404 and 406. In this case, there are three models 402, 404 and 406 respectively associated with the clusters 320, 322 and 324. Each model 402, 404 and 406 includes a surface aspect or model 410 and an appearance aspect or model 412. Additional or other models may also be included as needed or desired. In one embodiment, the shape model 410 may be the same for each orientation and only the appearance model 412 may be different for the different clustered orientations. In other embodiments, both models 410 and 412 are selected based on cluster orientation. The models are then employed for adaptation to the image collected. By adjusting the model selection process in accordance with the present principles, more accurate model adaptation can be achieved. This results in less computation time, earlier model convergence and improved measurement accuracy from a segmented model.

Model-based segmentation includes initialization and adaptation. During initialization, a rough position and orientation of the object in the image is determined. During adaptation, features are employed to adapt the model to the image. This is performed in several sub-steps with increasing degrees of freedom (rigid, affine, multi-affine, deformable, etc.). These sub-steps may be performed using known techniques.

In accordance with the present principles, an additional step or steps in-between initialization and adaptation are introduced. First, the position of the probe in an ultrasound image is determined from the metadata or image processing methods. Then, the relative position and orientation of an initialized model with respect to the probe is determined. Then, a nearest (most similar) orientation cluster from training is determined, and the features are chosen according to a best model based on the orientation cluster. The model is adapted and model-based segmentation can be performed.

It should be uderstood that while the present embodiments have been described in terms of a fetal ultrasound (e.g., can be a part of a fetal ultrasound product), the present principles may be employed using any real-time imaging system and on any part of an anatomy. For example, the present principles are applicable to modeling the heart based upon ultrasound images.

Figure 6:
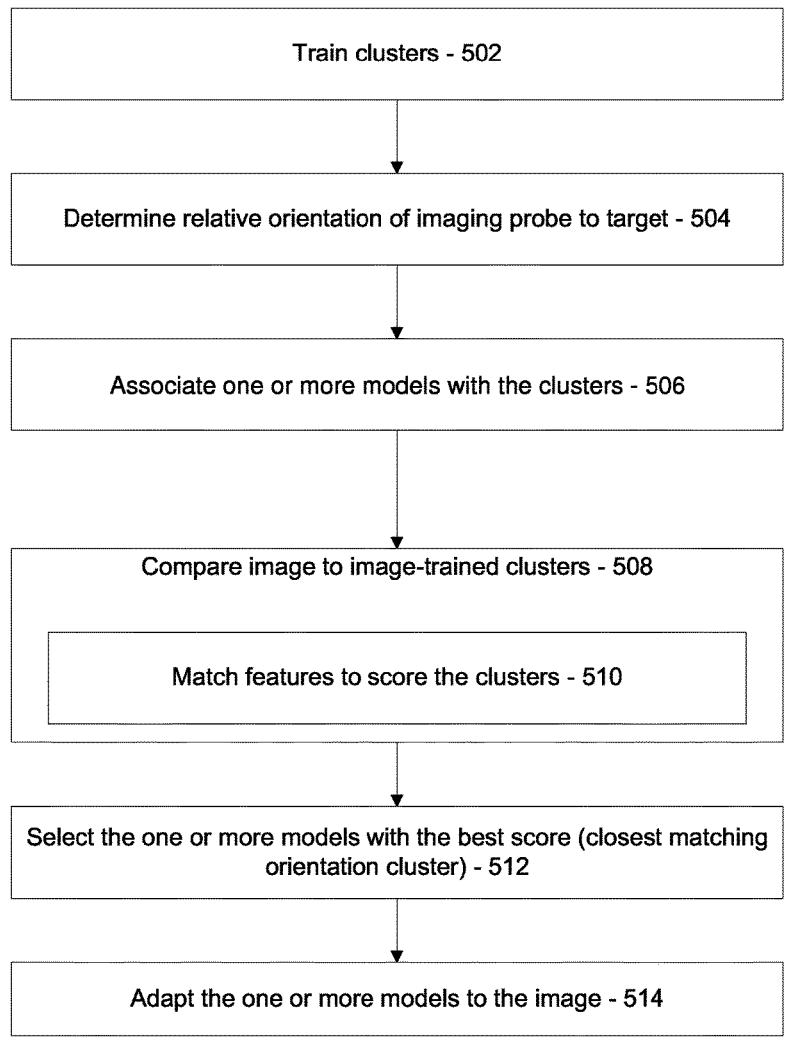
FIG. 6 is a flow diagram showing method for segmentation of a target using image clusters to determine appropriate models in accordance with illustrative embodiments.

Referring to FIG. 6, methods for model-based image segmentation are illustratively shown in accordance with the present principles. In block 502, a system training step may be employed to train a plurality of clusters (image-trained clusters). This process may include collecting images of a target having a particular orientation and combining the images to form the clusters. Clustering techniques known in the art may be employed to create and store the clusters. Each cluster represents a different orientation of the target relative to an imaging probe or other reference. In one embodiment, the target to be segmented may include an in utero fetus, and the plurality of clusters is trained using a plurality of ultrasonic fetal images for each of a plurality of positions of the target to be segmented.

In block 504, an ultrasonic probe is positioned at an orientation of relative to a target to be segmented during an imaging session. The position of the probe can be determined or identified by the system using metadata from an imaging device (e.g., an ultrasonic probe), DICOM headers, external fixtures, experience of the operator, registration systems, tracking sensors, computations, etc. In block 506, one or more models are associated with the image-trained clusters, where the orientation of the model corresponds with the orientation of the cluster. The one or more models may include one or more aspects. The aspects may be associated with the orientation of the cluster rather than the whole model. The aspects of a model may include a shape model, an appearance model, etc. For example, one aspect may include an appearance model, and the appearance model includes different appearance orientations of the target to be segmented. In another example, one aspect includes a shape model and the shape model includes different shape orientations for the target to be segmented.

In block 508, a collected ultrasound image is compared to the image-trained clusters to determine a closest matching orientation. This may be performed visually although an automatic comparison is preferable. In block 510, the comparing step may include matching features of the ultrasound image with features in the image-trained clusters to determine a similarity score. The similarity score may be used in determining the closest matching orientation, where the image-trained clusters each represent an orientation of the target. Likelihoods, similarity scores, etc. may be derived using techniques known in the art for image comparisons.

In block 512, the one or more models is/are selected based upon the image-trained cluster with the closest matching orientation for model adaptation to the ultrasound image. In block 514, the one or more models are adapted to the image. The selection and/or adaptation of the model(s) to the ultrasound image may be performed during an ultrasound imaging session, e.g., in real-time.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function; and e) no specific sequence of acts is intended to be required unless specifically indicated.

Having described preferred embodiments for acquisition-orientation-dependent features for model-based segmentation of ultrasound images (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the embodiments disclosed herein as outlined by the appended claims. Having thus described the details and particularity required by the patent laws, what is claimed and desired protected by Letters Patent is set forth in the appended claims.

The invention claimed is:

1. An ultrasound imaging system, comprising:
a processing system configured to be coupled to an ultrasound probe for acquiring ultrasound images of a target to be segmented, the ultrasound probe configured to acquire the ultrasound images of the target at a plurality of orientations; and
a memory operatively associated with the processing system, wherein the memory comprises:
a plurality of clusters of ultrasound images, wherein the plurality of images are clustered into a given cluster based on an orientation of the target with respect to the ultrasound probe such that each cluster is associated with a different orientation of the plurality of orientations;
one or more models associated with each of the plurality of clusters, the one or more models including at least one aspect comprising a plurality of instances, each aspect associated with the orientation of a respective cluster; and
wherein the memory further comprises executable instructions for:
a comparison unit configured to compare an ultrasound image acquired with the ultrasound probe to images in one or more of the plurality of clusters to determine a closest matching orientation by determining a closest matching cluster, and further configured to select at least one model instance based upon the closest matching orientation; and
a model adaptation module configured to adapt the at least one model instance to the ultrasound image and identify the orientation of the target to be segmented.

2. The system as recited in claim 1, wherein the memory further comprises a training database comprising training data for building the one or more models.

3. The system as recited in claim 1, wherein the target to be segmented includes an anatomical feature of a fetus.

4. The system as recited in claim 1, wherein the at least one aspect includes an appearance model for the target to be segmented, a shape model for the target to be segmented, or both.

5. The system as recited in claim 1, wherein the at least one aspect includes a shape model and each orientation cluster is associated with a shape orientation for the target to be segmented.

6. The system as recited in claim 1, wherein the comparison unit is further configured to compare features of the ultrasound image with features in images in the clusters to determine a similarity score for determining the closest matching orientation.

7. The system as recited in claim 1, wherein the model adaptation module is further configured to adapt the at least one model instance to the ultrasound image during an ultrasound imaging session.

8. The system as recited in claim 1, wherein the clusters are clustered based upon a relative ultrasonic probe orientation relative to the target being imaged.

9. The system as recited in claim 1, wherein each of the plurality of clusters of ultrasound images is associated with a different orientation of an in utero fetus in an image to be digitally segmented;
the one or more models includes an appearance model of the fetus, a shape model of the fetus, or both;
the comparison unit is configured to compare an acquired ultrasound image of the fetus to the clusters to determine a closest matching orientation and is further configured to select an instance of a model from the plurality of models based upon closest matching orientation; and
the model adaptation module is configured to adapt the instance of the models to the acquired ultrasound image of the fetus.

10. The system as recited in claim 9, wherein the plurality of clusters are trained using a plurality of images for each of a plurality of positions of the fetus to be digitally segmented.

11. The system as recited in claim 9, wherein the at least one aspect includes a shape model and each orientation cluster is associated with a shape orientation for the fetus to be digitally segmented.

12. The system as recited in claim 9, wherein the comparison unit is further configured to compare features of the acquired ultrasound image with features in images in the clusters to determine a similarity score for determining the closest matching orientation.

13. The system as recited in claim 9, wherein the model adaptation module is configured to adapt the instance of the models to the ultrasound image in real time during an ultrasound imaging session.

14. The system as recited in claim 9, wherein the clusters are clustered based upon a relative ultrasonic probe orientation relative to a fetus being imaged.

15. A method for model-based image segmentation of an ultrasound image, comprising:
positioning an ultrasonic probe at an orientation relative to a target to be segmented, the ultrasound probe configured to acquire ultrasound images of the target at a plurality of orientations;
comparing an ultrasound image acquired by the ultrasonic probe to images in one or more clusters of a plurality of clusters to determine a closest matching orientation by determining a closest matching cluster, wherein each cluster of the plurality of clusters comprises a plurality of images clustered into a given cluster based on an orientation of the target with respect to the ultrasound probe such that each cluster of the plurality of clusters is associated with a different orientation of the plurality of orientations;
selecting a model from a plurality of models based upon the closest matching orientation for model adaptation to the ultrasound image, wherein each of the plurality of models is associated with a respective cluster of the plurality of clusters, and wherein the model includes at least one aspect comprising a plurality of instances, each aspect associated with the orientation of the respective cluster; and
identifying an orientation of the target to be segmented in relation to the ultrasonic probe.

16. The method as recited in claim 15, wherein the target to be segmented includes an in utero fetus and the plurality of clusters are trained using a plurality of ultrasonic fetal images for each of a plurality of positions of the in utero fetus.

17. The method as recited in claim 15, wherein the at least one aspect includes an appearance model selected using an orientation cluster associated therewith for the target to be segmented.

18. The method as recited in claim 15, wherein the at least one aspect includes a shape model selected using an orientation cluster associated therewith for the target to be segmented.

19. The method as recited in claim 15, wherein comparing includes matching features of the ultrasound image with features in the image-trained clusters to determine a similarity score used in determining the closest matching orientation.

20. The method as recited in claim 15, further comprising adapting the one or more models to the ultrasound image during an ultrasound imaging session.

* * * * *